United States Patent
Menheere et al.

(10) Patent No.: US 12,535,183 B2
(45) Date of Patent: Jan. 27, 2026

(54) FLUID FLOW METERING DEVICE FOR AIRCRAFT SHAFT(S)

(71) Applicant: Pratt & Whitney Canada Corp., Longueuil (CA)

(72) Inventors: David Menheere, Norval (CA); Daniel Alecu, Ottawa (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 57 days.

(21) Appl. No.: 18/416,962

(22) Filed: Jan. 19, 2024

(65) Prior Publication Data
US 2025/0237349 A1    Jul. 24, 2025

(51) Int. Cl.
*F16N 27/00*    (2006.01)
*F16N 27/02*    (2006.01)

(52) U.S. Cl.
CPC .................. *F16N 27/00* (2013.01)

(58) Field of Classification Search
CPC ......... F16N 27/00; F16N 27/005; F16N 27/02
See application file for complete search history.

(56) References Cited

U.S. PATENT DOCUMENTS

| | | |
|---|---|---|
| 4,932,501 A | 6/1990 | Decker |
| 9,850,911 B2 | 12/2017 | Dayalan |
| 11,629,596 B1 | 4/2023 | Paolucci |
| 2017/0114835 A1* | 4/2017 | Ottow ............ F01D 5/026 |
| 2021/0324761 A1 | 10/2021 | Bouchard |
| 2023/0044553 A1 | 2/2023 | Baker-Ostiguy |

FOREIGN PATENT DOCUMENTS

EP    3715607 B1    2/2022

OTHER PUBLICATIONS

EP search report for EP25152953.3 dated Mar. 26, 2025.

* cited by examiner

*Primary Examiner* — Paul J Gray
(74) *Attorney, Agent, or Firm* — Getz Balich LLC

(57) ABSTRACT

An assembly for an aircraft includes a first shaft, a second shaft and a metering device. The metering device includes a device sidewall, a device first end, a device second end, a device bore, a plurality of channels and a plurality of ports. The device sidewall circumscribes the first shaft at the device first end. The device sidewall is disposed in a second shaft bore of the second shaft at the device second end. The device bore extends axially along the axis through the metering device between the device first end and the device second end. The channels are arranged circumferentially about the axis. Each of the channels projects radially into the device sidewall from the device bore and axially into the device sidewall from the device second end. The ports are arranged circumferentially about the axis. Each of the ports projects radially through the device sidewall.

20 Claims, 7 Drawing Sheets

FLUID FLOW METERING DEVICE FOR AIRCRAFT SHAFT(S)

TECHNICAL FIELD

This disclosure relates generally to an aircraft and, more particularly, to metering fluid flow within a system of the aircraft.

BACKGROUND INFORMATION

An aircraft system may include a flow metering device to provide metered flows of a fluid to various different locations. Various types and configurations of flow metering devices are known in the art. While these known flow metering devices have various benefits, there is still room in the art for improvement.

SUMMARY

According to an aspect of the present disclosure, an assembly is provided for an aircraft. This aircraft assembly includes a first shaft, a second shaft and a metering device. The first shaft includes a first shaft bore and a first shaft end. The first shaft bore projects axially along an axis into the first shaft from the first shaft end. The second shaft includes a second shaft bore and a second shaft end. The second shaft bore projects axially along the axis into the second shaft from the second shaft end. The metering device includes a device sidewall, a device first end, a device second end, a device bore, a plurality of channels and a plurality of ports. The device sidewall circumscribes the first shaft at the device first end. The device sidewall is disposed in the second shaft bore at the device second end. The device bore extends axially along the axis through the metering device between the device first end and the device second end. The channels are arranged circumferentially about the axis. Each of the channels projects radially into the device sidewall from the device bore and axially into the device sidewall from the device second end. The ports are arranged circumferentially about the axis. Each of the ports projects radially through the device sidewall.

According to another aspect of the present disclosure, another assembly is provided for an aircraft. This aircraft assembly includes a first shaft and a metering device. The first shaft includes a first shaft bore and a first shaft end. The first shaft bore projects axially along an axis into the first shaft from the first shaft end. The metering device includes a device sidewall, a device bore, a plurality of channels and a plurality of ports. The device sidewall form an outer peripheral boundary of the device bore with the first shaft projecting axially into the device bore to the first shaft end. The channels are arranged circumferentially about the device bore and partially axially overlap the first shaft. Each of the channels projects axially into the device sidewall from an end of the metering device. Each of the channels projects radially into the device sidewall from the device bore. The ports are arranged circumferentially about the device bore and partially axially overlap the first shaft. Each of the ports projects radially out from the device bore and through the device sidewall.

According to another aspect of the present disclosure, an apparatus is provided for an aircraft. This aircraft apparatus includes a metering device rotatable about an axis. The metering device includes a sidewall, a bore, a plurality of channels and a plurality of ports circumferentially interposed with and axially overlapping the channels. The sidewall extends axially along the axis from a first end of the sidewall to a second end of the sidewall. The sidewall extends radially from an inner side of the sidewall to an outer side of the sidewall with the inner side of the sidewall forming an outer peripheral boundary of the bore. A radial thickness of the sidewall increases as the sidewall extends axially towards the second end of the sidewall. The bore extends axially through the metering device. Each of the channels extends axially into the sidewall from the second end of the sidewall and projects partially radially into the sidewall from the bore. The channels include a first channel with a radial depth that increases as the first channel extends axially towards the second end of the sidewall. Each of the ports projects radially out from the bore and radially through the sidewall. The ports include a first port that is axially spaced from the first end of the sidewall and the second end of the sidewall.

Each of the ports may be spaced axially from the end of the metering device.

The metering device may be configured to receive lubricant from the first shaft bore. The channels may be configured to direct a first portion of the lubricant to a first location. The ports may be configured to direct a second portion of the lubricant to a second location axially spaced from the first location.

Each of the channels may be disposed circumferentially between and axially overlap a respective circumferentially neighboring pair of the ports.

Each of the channels may be disposed radially outboard of and axially overlap the first shaft.

Each of the channels may be axially spaced from the device first end.

The channels may be equispaced circumferentially about the axis.

The channels may include a first channel. A radial depth of the first channel may increase as the first channel extends axially within the device sidewall towards the device second end.

The channels may include a first channel. A lateral width of the first channel may increase as the first channel extends axially within the device sidewall towards the device second end.

Each of the ports may be disposed circumferentially between and axially overlap a respective circumferentially neighboring pair of the channels.

Each of the ports may be disposed radially outboard of and axially overlap the first shaft.

Each of the ports may be located axially between the second shaft end and the device first end.

Each of the ports may be axially spaced from the device first end and the device second end.

The ports may be equispaced circumferentially about the axis.

The metering device may also include a plurality of second channels and a plurality of second ports. The second channels may be arranged circumferentially about the axis. Each of the second channels may project radially into the device sidewall from the device bore and extend axially in the device sidewall. Each of the second ports may project radially out from a respective one of the second channels and through the device sidewall. The second ports may be located axially between the ports and the device second end.

The device sidewall may have a radial thickness extending radially between an inner side of the device sidewall and an outer side of the device sidewall. The radial thickness may increase as the device sidewall extends axially towards the device second end. The inner side of the device sidewall may form an outer peripheral boundary of the device bore.

The metering device may be mounted to and configured to rotate with the first shaft.

The metering device may be disengaged from the second shaft.

The second shaft may be configured to rotate independent of the first shaft.

The metering device may be mounted to and configured to rotate with the second shaft.

The aircraft assembly may also include a fluid source fluidly coupled to the first shaft bore. The metering device may be configured to receive fluid from the fluid source through the first shaft bore. The channels may be configured to direct a first portion of the fluid into the second shaft bore. The ports may be configured to direct a second portion of the fluid into a volume axially next to the second shaft at the second shaft end.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
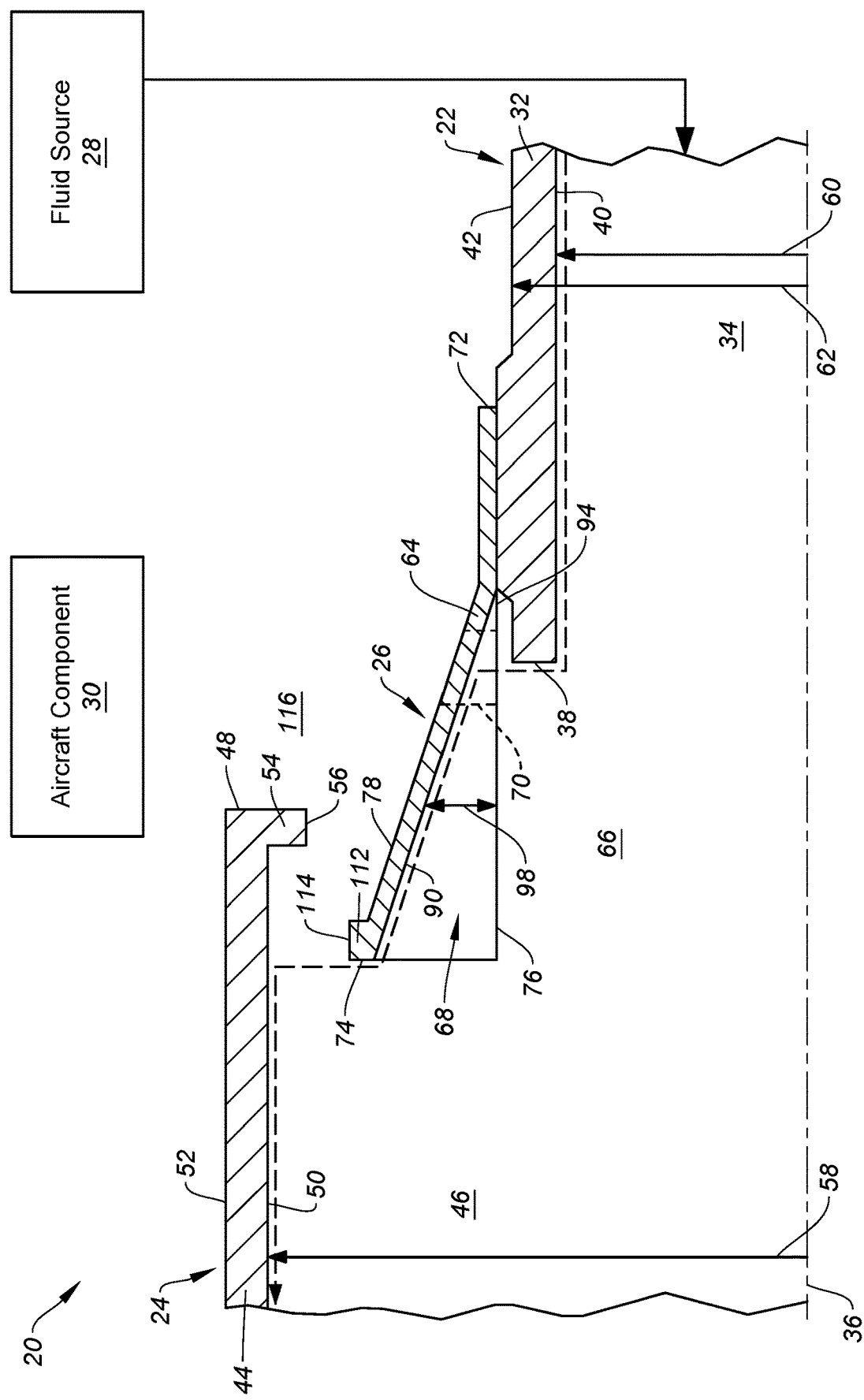
FIG. 1 is a partial side sectional illustration of an aircraft assembly at a first circumferential section taken along line 1-1 in FIG. 3.
Figure 2:
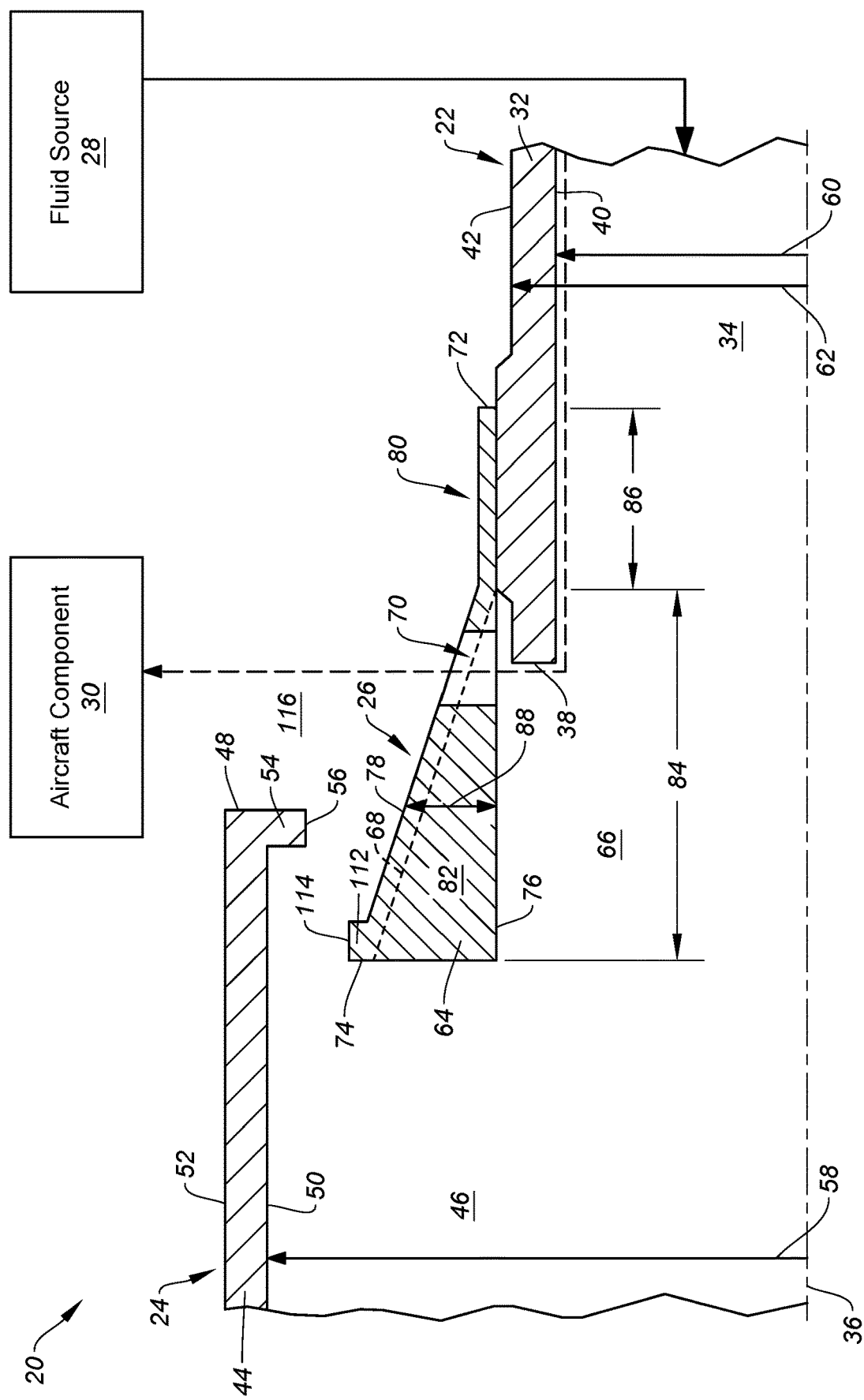
FIG. 2 is a partial side sectional illustration of the aircraft assembly at a second circumferential section taken along line 2-2 in FIG. 3.

FIGS. 1 and 2 illustrate an assembly 20 for an aircraft. This aircraft may be an airplane, a helicopter, a drone (e.g., an unmanned aerial vehicle (UAV)) or any other manned or unmanned aerial vehicle or system. The aircraft assembly 20 includes a first shaft 22, a second shaft 24 and a fluid flow metering device 26. The aircraft assembly 20 of FIGS. 1 and 2 also includes a fluid source 28 and an aircraft component 30.

The first shaft 22 of FIGS. 1 and 2 includes a sidewall 32 and an internal bore 34. The first shaft 22 and its first shaft sidewall 32 extend axially along an axis 36 in a first axial direction (e.g., right-to-left in FIGS. 1 and 2) to an end 38 of the first shaft 22 and its first shaft sidewall 32. This axis 36 may be a centerline axis of one or more of the assembly members 22, 24 and/or 26. The axis 36 may also or alternatively be a rotational axis of one or more of the assembly members 22, 24 and/or 26. The first shaft sidewall 32 extends radially from a radial inner side 40 of the first shaft sidewall 32 to a radial outer side 42 of the first shaft 22 and its first shaft sidewall 32. The first shaft sidewall 32 extends circumferentially about (e.g., completely around) the axis 36 providing the first shaft 22 and its first shaft sidewall 32 with, for example, a full-hoop (e.g., tubular) geometry.

The first shaft sidewall inner side 40 may have a regular cylindrical geometry, or a tapered (e.g., frustoconical) geometry tapering radially inwards towards the axis 36 as the first shaft 22 and its first shaft sidewall 32 extend axially along the axis 36 away from the first shaft end 38/in a second axial direction (e.g., left-to-right in FIGS. 1 and 2), for example. This first shaft sidewall inner side 40 forms a radial outer peripheral boundary of the first shaft bore 34. With this arrangement, the first shaft bore 34 of FIGS. 1 and 2 projects axially along the axis 36 into the first shaft 22 in the second axial direction from the first shaft end 38. The first shaft bore 34 projects radially out from the axis 36 to the first shaft sidewall inner side 40.

The second shaft 24 of FIGS. 1 and 2 includes a sidewall 44 and an internal bore 46. The second shaft 24 and its second shaft sidewall 44 extend axially along the axis 36 in the second axial direction to an end 48 of the second shaft 24 and its second shaft sidewall 44. The second shaft sidewall 44 extends radially from a radial inner side 50 of the second shaft sidewall 44 to a radial outer side 52 of the second shaft 24 and its second shaft sidewall 44. The second shaft sidewall 44 extends circumferentially about (e.g., completely around) the axis 36 providing the second shaft 24 and its second shaft sidewall 44 with, for example, a full-hoop (e.g., tubular) geometry.

The second shaft sidewall inner side 50 may have a regular cylindrical geometry, or a tapered (e.g., frustoconical) geometry tapering radially inwards towards the axis 36 as the second shaft 24 and its second shaft sidewall 44 extend axially along the axis 36 towards (or to) the second shaft end 48/in the second axial direction, for example. This second shaft sidewall inner side 50 forms a radial outer peripheral boundary of the second shaft bore 46. With this arrangement, the second shaft bore 46 of FIGS. 1 and 2 projects axially along the axis 36 into the second shaft 24 in the first axial direction from the second shaft end 48. The second shaft bore 46 projects radially out from the axis 36 to the second shaft sidewall inner side 50.

The second shaft 24 may also include a rim 54; e.g., an annular lip. This second shaft rim 54 is connected to (e.g., formed integral with) the second shaft sidewall 44 at (e.g., on, adjacent or proximate) the second shaft end 48. The second shaft rim 54 projects radially inward (towards the axis 36) from the second shaft sidewall 44 to a radial inner distal end 56 of the second shaft rim 54. The second shaft rim 54 thereby projects partially radially into the second shaft bore 46 from the second shaft sidewall 44.

The second shaft 24 of FIGS. 1 and 2 is axially spaced from the first shaft 22. The second shaft end 48, for example, is spaced from the first shaft end 38 by an axial distance along the axis 36. The second shaft 24 of FIGS. 1 and 2 therefore does not axially overlap the first shaft 22; however, the present disclosure is not limited to such an exemplary arrangement. The second shaft sidewall 44 of FIGS. 1 and 2 is also located radially outboard of the first shaft sidewall 32. A radius 58 from the axis 36 to the second shaft sidewall inner side 50 of FIGS. 1 and 2, for example, is greater than a radius 60 from the axis 36 to the first shaft sidewall inner side 40. Moreover, the second shaft sidewall inner side radius 58 of FIGS. 1 and 2 is also sized greater than a radius 62 from the axis 36 to the first shaft sidewall outer side 42.

Figure 3:
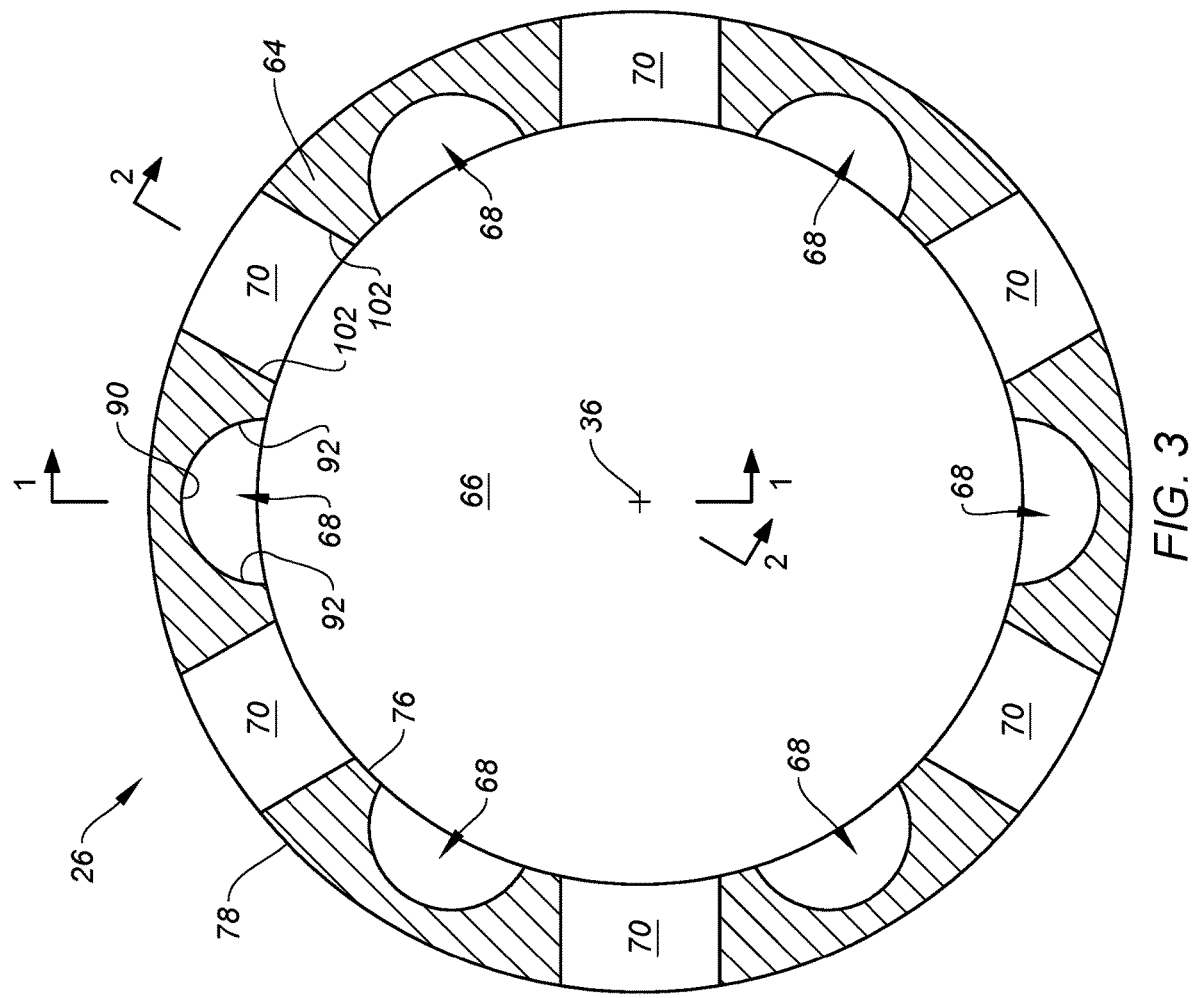
FIG. 3 is a cross-sectional illustration of a fluid flow metering device.

The metering device 26 of FIGS. 1 and 2 includes a sidewall 64, an internal bore 66, one or more channels 68 and one or more ports 70; see also FIG. 3. The metering device 26 and its device sidewall 64 extend axially along the axis 36 between and to a first end 72 of the metering device 26 and its device sidewall 64 and a second end 74 of the metering device 26 and its device sidewall 64. The device sidewall 64 extends radially from a radial inner side 76 of the device sidewall 64 and a radial outer side 78 of the device sidewall 64. The device sidewall 64 extends circumferentially about (e.g., completely around) the axis 36 providing the metering device 26 and its device sidewall 64 with, for example, a full-hoop (e.g., tubular or annular) geometry.

The device sidewall inner side 76 may have a regular cylindrical geometry. This device sidewall inner side 76 forms a radial outer peripheral boundary of the device bore 66. With this arrangement, the device bore 66 of FIGS. 1 and 2 projects axially along the axis 36 through the metering device 26 between and to the device first end 72 and the device second end 74. The device bore 66 projects radially out from the axis 36 to the device sidewall inner side 76.

Referring to FIG. 2, along an axial first section 80 of the metering device 26 at the device first end 72, the device sidewall outer side 78 may have a regular cylindrical geometry. Along an axial second section 82 of the metering device 26 at the device second end 74, the device sidewall outer side 78 may have a tapered (e.g., frustoconical) geometry tapering radially inwards towards the axis 36 as the metering device 26 and its device sidewall 64 extends axially along the axis 36 from (or about) the device second end 74 to the first section 80 of the metering device 26/towards the device first end 72. Here, an axial length 84 of the second section 82 of the metering device 26 is (e.g., at least 1.5×, 2×, 3×, etc.) greater than an axial length 86 of the first section 80 of the metering device 26. With this arrangement, a radial thickness 88 of the device sidewall 64 between the device sidewall inner side 76 and the device sidewall outer side 78 may be substantially uniform (constant) axially along the first section 80 of the metering device 26. The device sidewall radial thickness 88, however, varies axially along the second section 82 of the metering device 26. The device sidewall radial thickness 88 of FIGS. 1 and 2, for example, increases as the metering device 26 and its device sidewall 64 extend axially from (or about) the first section 80 of the metering device 26 to (or about) the device second end 74.

Referring to FIG. 3, the channels 68 and the ports 70 may be interposed with one another circumferentially about the axis 36. The channels 68 of FIG. 3, for example, are arranged (e.g., and equispaced, or non-equispaced) circumferentially about the axis 36 and the device bore 66 in a channel array; e.g., a circular array. Similarly, the ports 70 of FIG. 3 are arranged (e.g., and equispaced, or non-equispaced) circumferentially about the axis 36 and the device bore 66 in a port array; e.g., a circular array. Each channel 68 is located circumferentially between a respective circumferentially neighboring (e.g., adjacent) pair of the ports 70. Each channel 68 may also extend axially partially or completely along (e.g., axially overlap) its respective neighboring ports 70; see also FIG. 4. Similarly, each port 70 is located circumferentially between a respective circumferentially neighboring pair of the channels 68. Each port 70 may also extend axially partially or completely along (e.g., axially overlap) its respective neighboring channels 68; see also FIG. 4.

Figure 4:
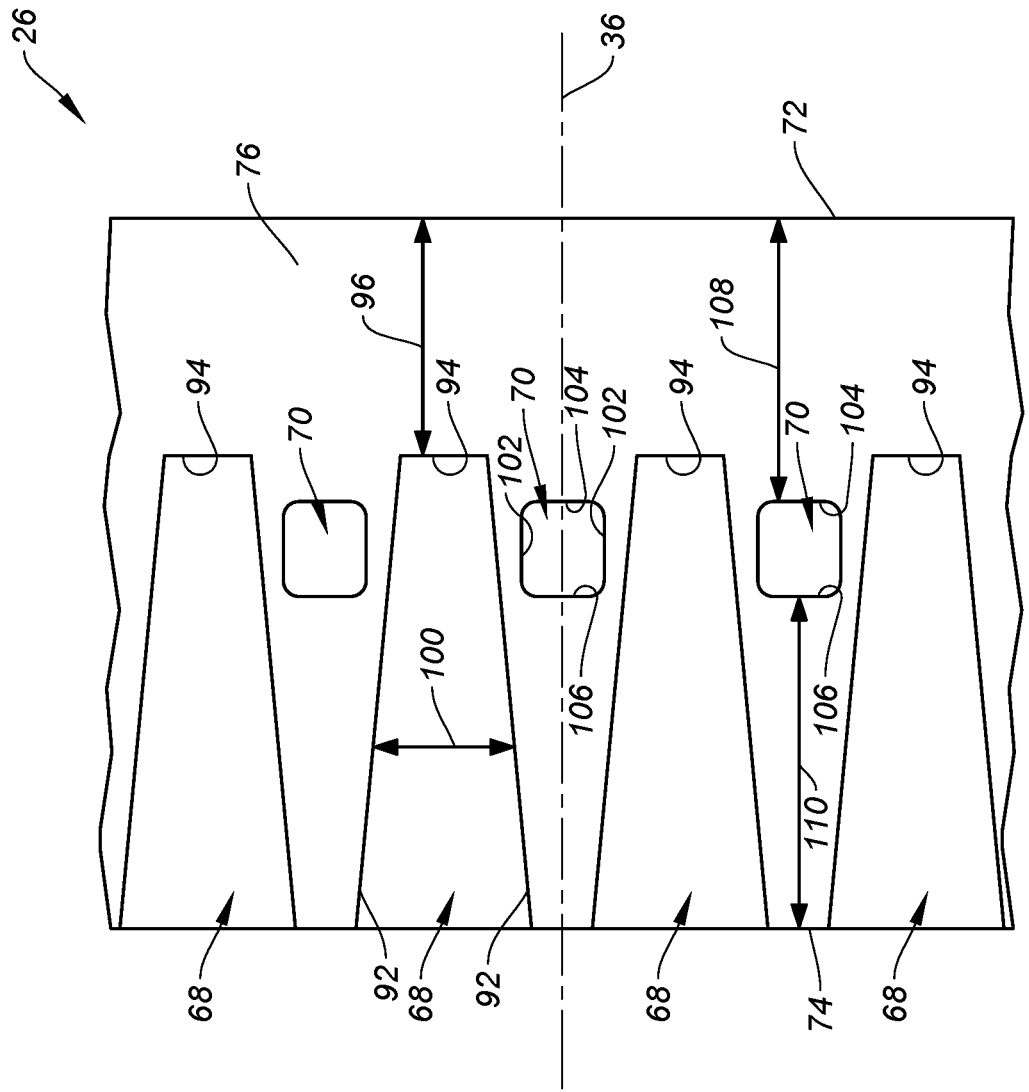
FIG. 4 is a plan view illustration of a portion of the fluid flow metering device at an inner side of the fluid flow metering device.

Each channel 68 projects partially radially into the device sidewall 64 from the device bore 66 (at the device sidewall inner side 76) to a distal radial outer side 90 of the respective channel 68. Each channel 68 extends laterally (e.g., circumferentially or tangentially) within the device sidewall 64 between opposing lateral sides 92 of the respective channel 68. Referring to FIG. 4, each channel 68 projects axially along the axis 36 into the device sidewall 64 from the device second end 74 to a distal axial end 94 of the respective channel 68, which channel end 94 is axially spaced from the device first end 72 by an axial distance 96.

Each channel 68 of FIG. 1 may have a tapered configuration. For example, a radial depth 98 of each channel 68, measured from the device sidewall inner side 76 to the respective channel outer side 90, may vary axially along the respective channel 68. The channel depth 98, for example, may increase as the respective channel 68 extends axially along the axis 36 from (or about) its channel end 94 to (or about) the device second end 74. Moreover, referring to FIG. 4, a lateral width 100 of each channel 68, measured between the opposing channel lateral sides 92 at the device sidewall inner side 76, may vary axially along the respective channel 68. The channel width 100, for example, may increase as the respective channel 68 extends axially along the axis 36 from (or about) its channel end 94 to (or about) the device second end 74. Referring to FIG. 3, each channel 68 may have a curved (e.g., arcuate, splined, partially circular, etc.) outer peripheral boundary when viewed, for example, in a reference plane perpendicular to the axis 36; e.g., plane of FIG. 3. The present disclosure, however, is not limited to such an exemplary channel configuration or cross-sectional geometry.

Each port 70 projects radially out from the device bore 66 and through the device sidewall 64 radially between the device sidewall inner side 76 and the device sidewall outer side 78. Each port 70 extends laterally within the device sidewall 64 between opposing lateral sides 102 of the respective port 70. Referring to FIG. 4, each port 70 extends axially within the device sidewall 64 between opposing axial sides 104 and 106 of the respective port 70. The port first axial side 106 is axially spaced from the device first end 72 by an axial distance 108, which axial distance 108 may be different (e.g., greater) than the axial distance 96. The port second axial side 106 is axially spaced form the device second end 74 by an axial distance 110, which axial distance 110 may be equal to or different (e.g., greater) than the axial distance 108. Each port 70 has a cross-sectional geometry when viewed, for example, in a reference plane parallel with the axis 36 and/or perpendicular to a longitudinal centerline of the respective port 70. Here, the cross-sectional geometry has a polygonal (e.g., square or rectangular) shape with radiused corners. The present disclosure, however, is not limited to such an exemplary port configuration or cross-sectional geometry.

Referring to FIGS. 1 and 2, the metering device 26 may also include a rim 112; e.g., an annular lip. This device rim 112 is connected to the device sidewall 64 at the device second end 74. The device rim 112 projects radially outward (away from the axis 36) from the device sidewall outer side 78 to a radial outer distal end 114 of the device rim 112.

The metering device 26 is arranged with the first shaft 22 at its first shaft end 38. The first shaft 22 and its first shaft sidewall 32 of FIGS. 1 and 2, for example, project partially axially into the device bore 66 to its first shaft end 38. The first shaft end 38 may be axially aligned with the channels 68 and/or the ports 70. The channels 68 and the ports 70 are located radially outboard of and partially axially overlap the first shaft 22 and its first shaft sidewall 32 at the first shaft end 38. The device sidewall 64 is disposed radially outboard of, partially axially overlaps and extends circumferentially about (e.g., circumscribes) the first shaft 22 and its first shaft sidewall 32 at the first shaft end 38. The metering device 26 and its device sidewall 64 of FIGS. 1 and 2 are mounted to the first shaft 22 at the first shaft end 38. This mounting may be through a threaded connection, an interference (e.g., press fit) connection, a bonded (e.g., welded, brazed, etc.) connection or the like. With this arrangement, the metering device 26 is fixed to and is operable to rotate with the first shaft 22 about the axis 36.

Figure 5:
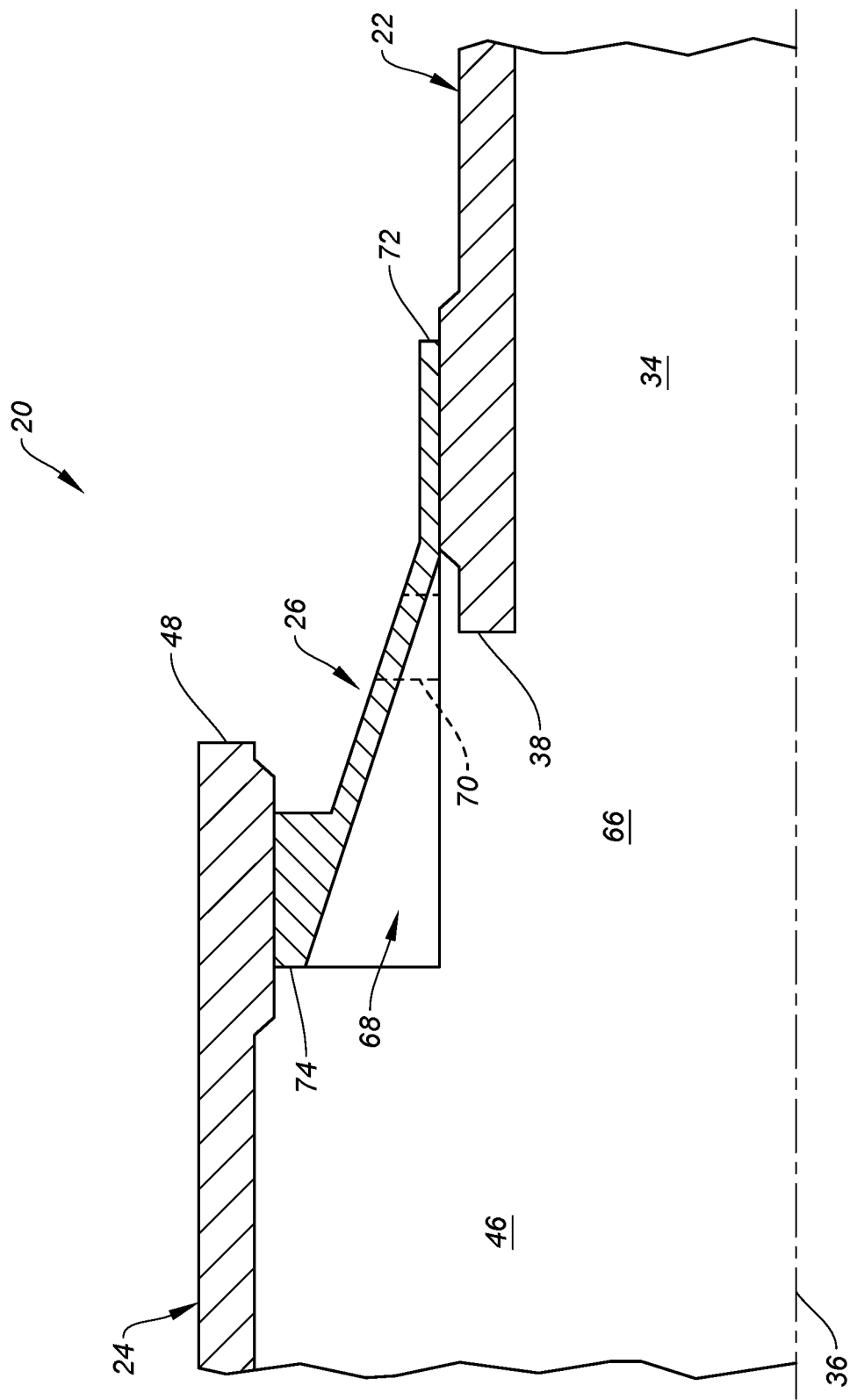
FIG. 5 is a partial side sectional illustration of the aircraft assembly where the fluid flow metering device is mounted to first and second shafts.

The metering device 26 is further arranged with the second shaft 24 at its second shaft end 48. The metering device 26 and its device sidewall 64, for example, projects partially axially into the second shaft bore 46 to its device second end 74. The device rim 112 of FIGS. 1 and 2, for example, is disposed within the second shaft bore 46 and axially spaced from the second shaft rim 54. The second shaft sidewall 44 is disposed radially outboard of, partially axially overlaps and extends circumferentially about (e.g., circumscribes) the metering device 26 and its device sidewall 64 at the device second end 74. Here, the metering device 26 and its device sidewall 64 are radially spaced inward from the second shaft sidewall 44. The metering device 26 may thereby be (e.g., completely) disengaged from/structurally independent of the second shaft 24. The metering device 26, for example, may be configured to rotate with the first shaft 22 about the axis 36 independent of the second shaft 24. Alternatively, referring to FIG. 5, the metering device 26 may radially engage and be mounted to the second shaft 24. The metering device 26 may thereby also be fixed to and operable to rotate with the second shaft 24 about the axis 36. The metering device 26, for example, may be configured as a quill shaft between the first shaft 22 and the second shaft 24.

Referring to FIGS. 1 and 2, the first shaft bore 34 is fluidly coupled to the second shaft bore 46 through the metering device 26. More particularly, the first shaft bore 34 is fluidly coupled to the second shaft bore 46 through the device bore 66 and the channels 68. The first shaft bore 34 is also fluidly coupled to a volume 116 located radially outside of the metering device 26 and axially next to the second shaft 24 through the metering device 26. More particularly, the first shaft bore 34 is fluidly coupled to the volume 116 through the device bore 66 and the ports 70.

During operation, the first shaft 22 and its first shaft bore 34 may receive fluid (e.g., a liquid such as lubricant) from the fluid source 28; e.g., a lubricant reservoir or pump. The fluid may be (e.g., substantially) evenly distributed about the rotating first shaft sidewall inner side 40 as the fluid flows axially through the first shaft bore 34 to the metering device 26. As the fluid flows off the first shaft end 38, that fluid is directed into the channels 68 and the ports 70. Briefly, circumferential widths of the elements 68 and 70 at locations axially aligned with the first shaft end 38 tune fluid distribution between the elements 68 and 70. A first portion of the fluid directed into the channels 68 is subsequently directed axially into the second shaft 24 and its second shaft bore 46. A second portion of the fluid directed into the ports 70 is subsequently directed radially into the volume 116 and, for example, directly or indirectly to the aircraft component 30. The second portion of the fluid may thereby be used to lubricant, cool and/or otherwise service the aircraft component 30; e.g., a bearing, a gear or a gear system, a wet seal element, etc. This second portion of the fluid may be equal to or different (e.g., greater or less) than the second portion of the fluid. Note, a ratio of how much of the fluid is directed radially outward by the metering device 26 and how much of the fluid is directed axially by the metering device 26 may be tailored by adjusting the lateral widths of the channels 68 and the ports 70, among other things.

Figure 6:
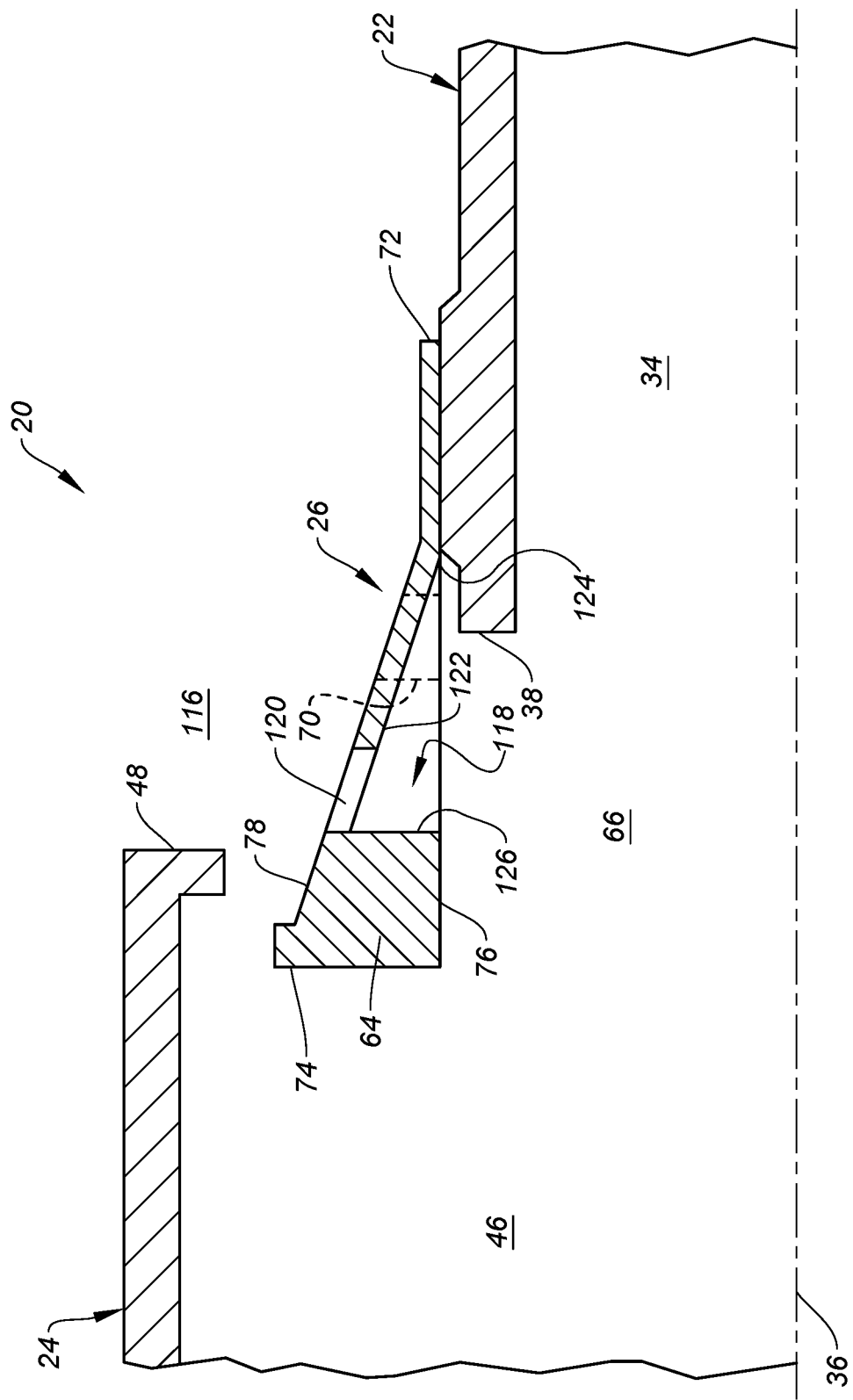
FIG. 6 is a partial side sectional illustration of the aircraft assembly with an alternative fluid flow metering device.
Figure 7:
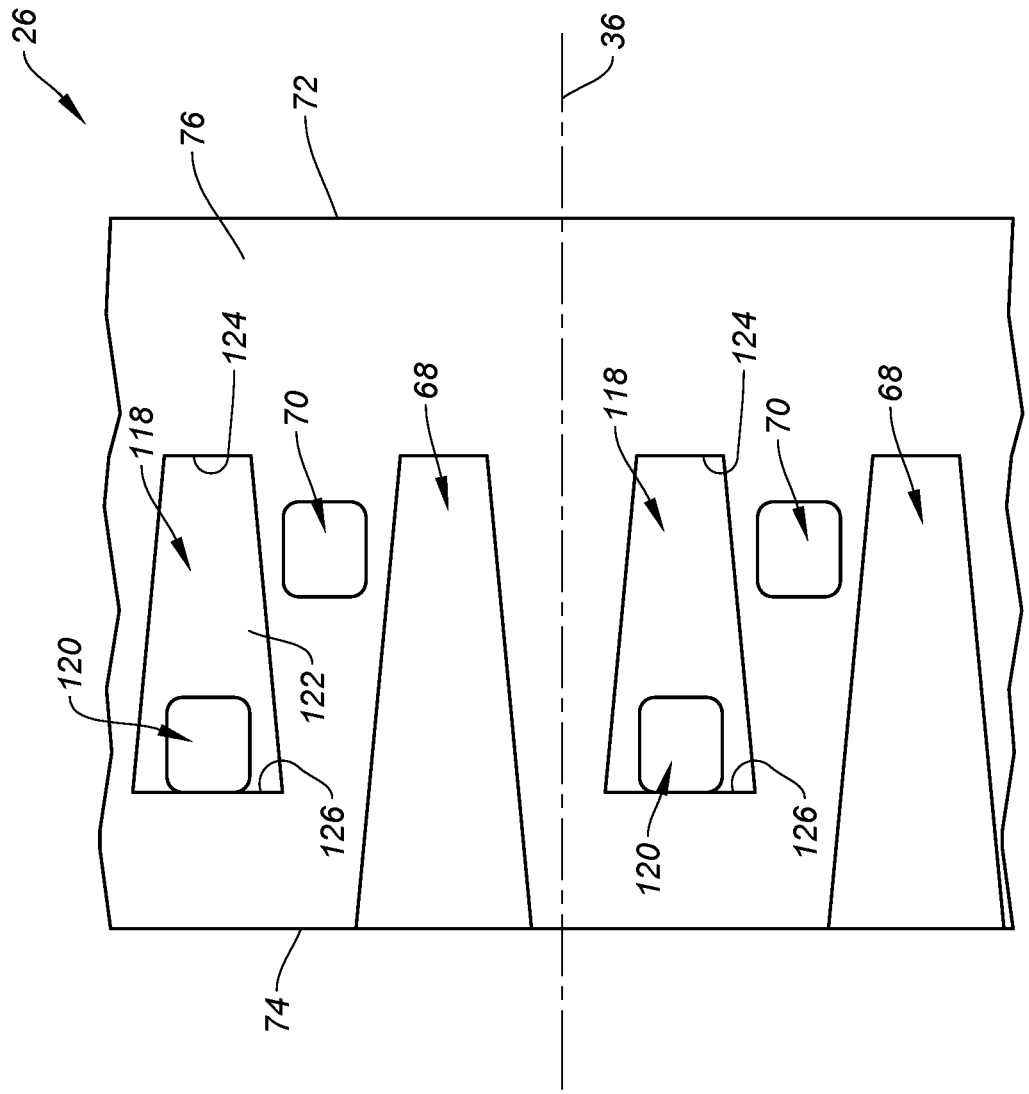
FIG. 7 is a plan view illustration of a portion of the fluid flow metering device of FIG. 6 at the inner side of the fluid flow metering device.

In some embodiments, referring to FIGS. 6 and 7, the metering device 26 may also include one or more second channels 118 and one or more second ports 120. The second channels 118 may be arranged circumferentially about the axis 36. Each of the second channels 118 projects partially radially into the device sidewall 64 from the device bore 66 (at the device sidewall inner side 76) to a distal radial outer side 122 of the respective second channel 118. Each second channel 118 may extend axially in (e.g., within) the device sidewall 64 between opposing axial ends 124 and 126 of the respective second channel 118. Each second port 120 may be located at the second end 126 of a respective one of the second channels 118. Each second port 120 may project radially out from the respective second channel 118 and through the device sidewall 64 to the device sidewall outer side 78. Each second port 120 may be axially spaced from the device second end 74 and the array of the first ports 70. With this arrangement, the metering device 26 is configured to deliver portions of the fluid to three different locations axially along the axis 36.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
a first shaft including a first shaft bore and a first shaft end, the first shaft bore projecting axially along an axis into the first shaft from the first shaft end;
a second shaft including a second shaft bore and a second shaft end, the second shaft bore projecting axially along the axis into the second shaft from the second shaft end; and
a metering device including a device sidewall, a device first end, a device second end, a device bore, a plurality of channels and a plurality of ports, the device sidewall circumscribing the first shaft at the device first end, the device sidewall disposed in the second shaft bore at the device second end, the device bore extending axially along the axis through the metering device between the device first end and the device second end, the plurality of channels arranged circumferentially about the axis and running axially along an inner side of the device sidewall, each of the plurality of channels projecting partially radially into the inner side of the device sidewall from the device bore and axially into the device sidewall from the device second end, the plurality of ports arranged circumferentially about the axis, and each of the plurality of ports projecting radially through the device sidewall,
wherein the first shaft bore is in fluid communication with the plurality of channels and the plurality of ports.

2. The assembly of claim 1, wherein each of the plurality of channels is disposed circumferentially between and axially overlaps a respective circumferentially neighboring pair of the plurality of ports.

3. The assembly of claim 1, wherein each of the plurality of channels is disposed radially outboard of and axially overlaps the first shaft.

4. The assembly of claim 1, wherein each of the plurality of channels is axially spaced from the device first end.

5. The assembly of claim 1, wherein
the plurality of channels comprises a first channel; and
a radial depth of the first channel increases as the first channel extends axially within the device sidewall towards the device second end.

6. The assembly of claim 1, wherein
the plurality of channels comprises a first channel; and
a lateral width of the first channel increases as the first channel extends axially within the device sidewall towards the device second end.

7. The assembly of claim 1, wherein each of the plurality of ports is disposed circumferentially between and axially overlaps a respective circumferentially neighboring pair of the plurality of channels.

8. The assembly of claim 1, wherein each of the plurality of ports is disposed radially outboard of and axially overlaps the first shaft.

9. The assembly of claim 1, wherein each of the plurality of ports is located axially between the second shaft end and the device first end.

10. The assembly of claim 1, wherein each of the plurality of ports is axially spaced from the device first end and the device second end.

11. The assembly of claim 1, wherein the metering device further includes
a plurality of second channels arranged circumferentially about the axis, each of the plurality of second channels projecting radially into the device sidewall from the device bore and extending axially in the device sidewall; and
a plurality of second ports, each of the plurality of second ports projecting radially out from a respective one of the plurality of second channels and through the device sidewall, and the plurality of second ports located axially between the plurality of ports and the device second end.

12. The assembly of claim 1, wherein
the device sidewall has a radial thickness extending radially between the inner side of the device sidewall and an outer side of the device sidewall;
the radial thickness increases as the device sidewall extends axially towards the device second end; and
the inner side of the device sidewall forms an outer peripheral boundary of the device bore.

13. The assembly of claim 1, wherein the metering device is mounted to and configured to rotate with the first shaft.

14. The assembly of claim 1, wherein the metering device is disengaged from the second shaft.

15. The assembly of claim 1, wherein the metering device is mounted to and configured to rotate with the second shaft.

16. The assembly of claim 1, further comprising:
a fluid source fluidly coupled to the first shaft bore;
the metering device configured to receive fluid from the fluid source through the first shaft bore;
the plurality of channels configured to direct a first portion of the fluid into the second shaft bore; and
the plurality of ports configured to direct a second portion of the fluid into a volume axially next to the second shaft at the second shaft end.

17. An assembly for an aircraft, comprising:
a first shaft including a first shaft bore and a first shaft end, the first shaft bore projecting axially along an axis into the first shaft from the first shaft end;
a metering device including a device sidewall, a device bore, a plurality of channels and a plurality of ports, the device sidewall forming an outer peripheral boundary of the device bore with the first shaft projecting axially into the device bore to the first shaft end, the plurality of channels arranged circumferentially about the device bore, running axially along an inner side of the device sidewall, and partially axially overlapping the first shaft, each of the plurality of channels projecting axially into the device sidewall from an end of the metering device and projecting partially radially into the inner side of the device sidewall from the device bore, the plurality of ports arranged circumferentially about the device bore and partially axially overlapping the first shaft, and each of the plurality of ports projecting radially out from the device bore and through the device sidewall,
wherein the first shaft bore is in fluid communication with the plurality of channels and the plurality of ports.

18. The assembly of claim 17, wherein each of the plurality of ports is spaced axially from the end of the metering device.

19. The assembly of claim 17, wherein
the metering device is configured to receive lubricant from the first shaft bore;
the plurality of channels are configured to direct a first portion of the lubricant to a first location; and
the plurality of ports are configured to direct a second portion of the lubricant to a second location axially spaced from the first location.

20. An apparatus for an aircraft, comprising:
a metering device rotatable about an axis, the metering device including a sidewall, a bore, a plurality of channels and a plurality of ports circumferentially interposed with and axially overlapping the plurality of channels;
the sidewall extending axially along the axis from a first end of the sidewall to a second end of the sidewall, the sidewall extending radially from an inner side of the sidewall to an outer side of the sidewall with the inner side of the sidewall forming an outer peripheral boundary of the bore, and a radial thickness of the sidewall increasing as the sidewall extends axially towards the second end of the sidewall;
the bore extending axially through the metering device;
each of the plurality of channels running axially along the inner side of the sidewall, extending axially into the sidewall from the second end of the sidewall, and projecting partially radially into the inner side of the sidewall from the bore, the plurality of channels comprising a first channel with a radial depth that increases as the first channel extends axially towards the second end of the sidewall; and
each of the plurality of ports projecting radially out from the bore and radially through the sidewall, the plurality of ports comprising a first port that is axially spaced from the first end of the sidewall and the second end of the sidewall.

* * * * *